United States Patent [19]

Mayhugh et al.

[11] Patent Number: 5,355,675
[45] Date of Patent: Oct. 18, 1994

[54] STABILIZED SPEED-CONTROL SYSTEM FOR A HYDROSTATIC TRANSMISSION

[75] Inventors: Joel M. Mayhugh; Georgios L. Varsamis, both of Houston, Tex.

[73] Assignee: Western Atlas International, Inc., Houston, Tex.

[21] Appl. No.: 114,486

[22] Filed: Aug. 31, 1993

[51] Int. Cl.⁵ .................... F16D 31/00; F16D 31/02
[52] U.S. Cl. ............................. 60/327; 60/395; 60/427; 60/494
[58] Field of Search ............ 60/395, 427, 450, 468, 60/494, 327; 91/459

[56] References Cited

U.S. PATENT DOCUMENTS

| | | | |
|---|---|---|---|
| 4,194,365 | 3/1980 | Stoufflet et al. | 60/494 X |
| 4,240,255 | 12/1980 | Benilan | 60/468 X |
| 4,434,972 | 3/1984 | Charles | 254/340 |
| 4,475,163 | 10/1984 | Chandler et al. | 364/562 |
| 4,653,271 | 3/1987 | Reeves et al. | 60/494 |
| 4,694,649 | 9/1987 | Howeth | 60/468 |
| 4,727,718 | 3/1988 | Koopmans | 60/468 |
| 4,958,494 | 9/1990 | Maki et al. | 60/468 |
| 5,048,294 | 9/1991 | Oshina et al. | 60/468 |
| 5,048,295 | 9/1991 | Hoscheler | 60/494 X |

Primary Examiner—Edward K. Look
Assistant Examiner—Hoang Nguyen
Attorney, Agent, or Firm—William A. Knox

[57] ABSTRACT

A hydrostatic rotary power transmission system that provides a stable rotation rate at very slow rotation speeds is provided. The system operates in two speed control modes, one being a normal mode for use in the rotation rate range of 50 rpm to the maximum rated speed and a second or fine speed control mode for use in the rotation range of <1.0 to 250 rpm. In the normal control mode, the rotation speed is a function of the displacement of the hydrostatic pump. In the fine speed control mode, the motor rotation rate is a function of the flow rate through a proportional-flow valve that is downstream of the motor.

11 Claims, 4 Drawing Sheets

STABILIZED SPEED-CONTROL SYSTEM FOR A HYDROSTATIC TRANSMISSION

BACKGROUND OF THE INVENTION

1. Field of the Invention

This invention relates to a method for providing stable rotation rates for a hydrostatic transmission when the transmission operates at very low speeds on the order of a few revolutions per minute or less.

2. Discussion of Related Art

In the art of measuring certain physical characteristics of the earth formations penetrated by a borehole such as an oil well, a logging sonde is lowered into the borehole from a cable to depths of many thousands or perhaps even two or three tens of thousands of feet. Many of the physical measurements are made continuously as the tool is drawn slowly past the formations of interest. The time base of the measurements is a function of the speed of tool displacement and depends critically on the uniformity of tool movement.

Many measurements depend on the flight time of an interrogation signal that is launched into the formation adjacent to the tool. The interrogation signal solicits a response signal from the formation so that the tool must, in effect, dwell in situ awaiting the response. In actual practice, the tool is configured such that the interrogation device, that is, the transmitter, is spaced apart from and above a sensor device by some appropriate finite distance. The tool is moved upwards, for example, at a desired speed the so that sensor will move into a position opposite the original interrogation location by the time that the response signal actually emerges from the formation. That desideratum demands that the tool be moved at an accurately-selected speed that is appropriate to the type and timing of the measurements being made. The logging-tool sonde speed ranges may typically vary from one or two feet per minute to several hundred feet per minute.

The logging tool is suspended in the borehole from a logging cable that serves both as a support means for the tool and as a means for interchanging information, power and data between the surface processing equipment and the sensors in the tool. The cable is payed out and retrieved using a draw works or hoisting drum having a capacity of many thousands of feet of cable. Usually the hoisting drum is powered by a conventional hydrostatic drive. Hydraulic power may be provided by a desired type of prime mover such as a diesel engine. The hydrostatic drive may have a power rating on the order of 150 to 200 hp.

As explained earlier, tool deployment requires a stable speed control having a wide dynamic range. Conventional hydraulic drives, however, become unstable when the variable-displacement pump flow-rate and the rotational speed of the motor must be reduced to accommodate very low cable-drum speeds. One manufacturer (Mannesmann Rexroth), with respect to their axial piston motors, warns that " . . . if uniformity of rotation is required, however, the speed should not be allowed to fall below 50 rpm . . . " yet rotation rates of but a single rpm are often required. Part of the problem stems from the inability of the variable displacement hydrostatic pump itself to precisely control the flow at very low flow rates. Hose length, hose diameter, erratic hose expansion and fluid compression under extreme pressures all tend to worsen the problem. Rigid plumbing helps a little bit but is undesirable because it is inflexible and awkward to implement in the field.

In the well-logging industry, logging cable drums are hydrostatically powered as described. The required speed range is achieved by providing a mechanical two- or three-speed gear transmission. The obvious disadvantage to such transmissions is that the speed-change curve is not smooth; it necessarily has two or three discontinuities. That is, the logging run must be interrupted while the operator changes gears.

The assignee of this invention provides a set of change gears that involve disk-type clutches to provide continuous mechanical gear-ratio changes. That transmission has the disadvantage of being very expensive and somewhat demanding maintenance-wise.

There is a need for a pure hydrostatic transmission that is characterized by a wide dynamic range in speed control and output power and a mechanism that will be economical, easily maintained and highly reliable.

SUMMARY OF THE INVENTION

This invention provides a stable, closed-loop bi-directional hydrostatic rotary transmission system that has a wide dynamic speed control range. The system includes a hydrostatic motor that is fluidly coupled to a variable displacement pump by a two-position, mode control means. With the control means set to a first position, a first circuit configuration couples the motor to the pump such that the operation of the motor is a function of the displacement of the pump. With the control means set to the second position, the first circuit configuration is disabled and the motor is interconnected to the pump in a second circuit configuration. In the second configuration, the operation of the motor is a function of the fluid flow as metered through a proportional-flow control valve downstream of the motor.

The rotational speed of the motor, when coupled in the first circuit configuration, is a function of the displacement control signal applied to the variable displacement pump. The rotational speed of the motor when in the second circuit configuration, is a function of the fluid flow rate as metered through the proportional-flow control valve by reason of the throttling action of that valve.

In the first circuit configuration, the pressure drop across the motor is load-dependent. In the second circuit configuration, the pressure drop across the proportional-flow metering-out valve is a preselected fixed value.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DESCRIPTION OF THE PREFERRED EMBODIMENT

Figure 1:
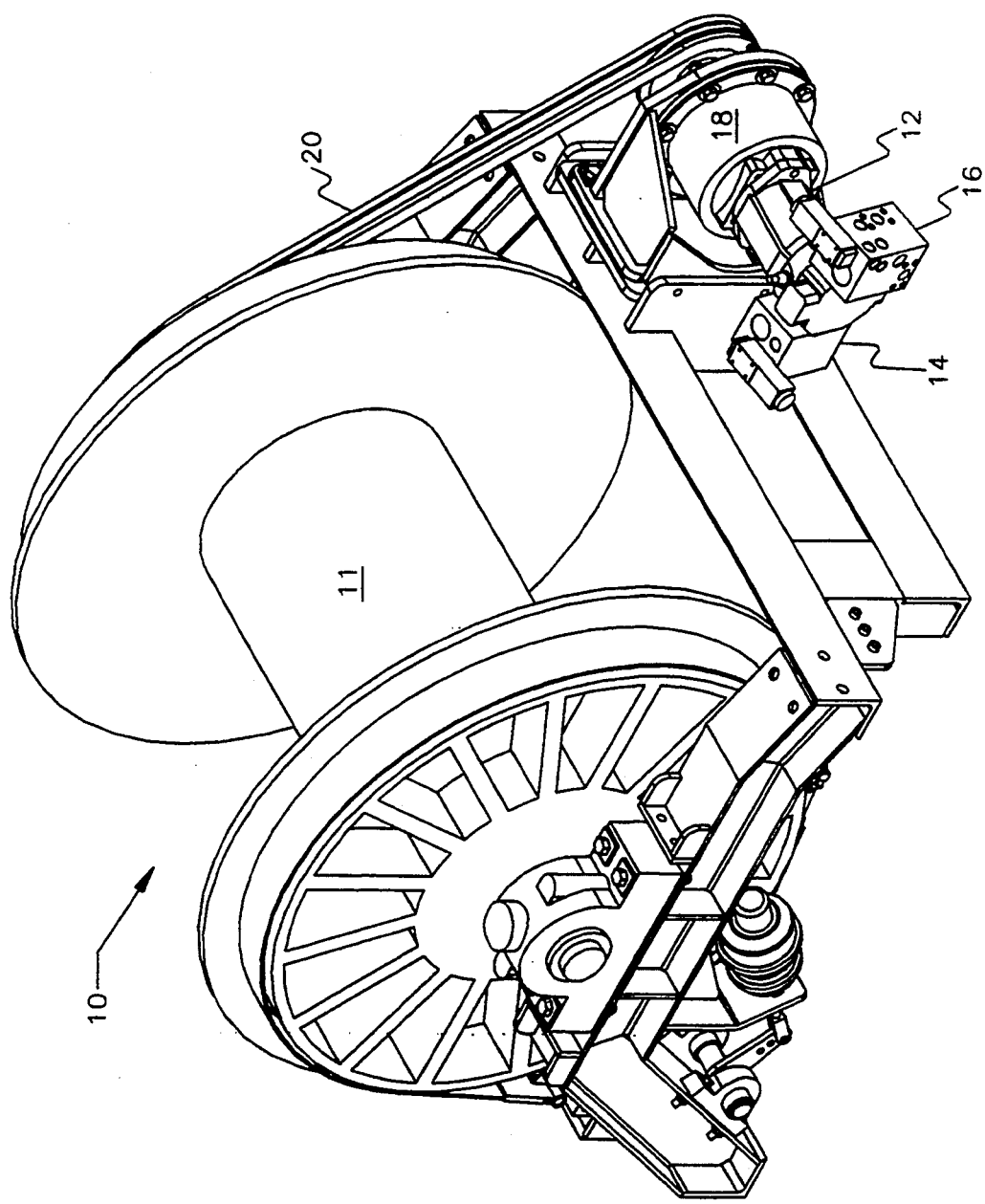
FIG. 1 is a showing of an exemplary application of this invention such as to an oil-field logging-tool hoisting drum.

FIG. 1 is an exemplary hoisting drum unit 10 for a well-logging sonde with which the dual-mode speed control device of this invention may be used advantageously. The exemplary unit consists of a skid- or truck-mounted drum 11 that is driven by an hydrostatic motor 12. Control is provided by suitable proportional-flow control valves mounted on manifolds 14 and 16. For purposes of this example, valving in manifold 14 controls the drum rotation in the uphole winding direction and valving in manifold 16 controls the drum rotation in the downhole direction, all of which will be described later. The motor is coupled to drum 11 through a single-speed transmission 18 by a drive chain 20. Hydraulic power is provided from a remotely-located pump (not shown in FIG. 1) and hydraulic fluid supply through suitable hoses in a conventional manner. Motor 12 is hi-directional and can be used as a dynamic brake when the tool is being deployed down-hole.

As was explained earlier, it is required that the hoisting drum shall have a wide dynamic range of rotation rates that will remain stable from as little as <1.0 revolution per minute (rpm) to a hoisting speed corresponding to the maximum rated speed of the motor itself which may be several thousand rpm. That desideratum is accomplished by providing a normal speed control mode to operate the motor over a range of 50 rpm to the maximum rated motor speed and a fine speed control mode for operating over the range from <1.0 to 250 rpm.

Figure 2:
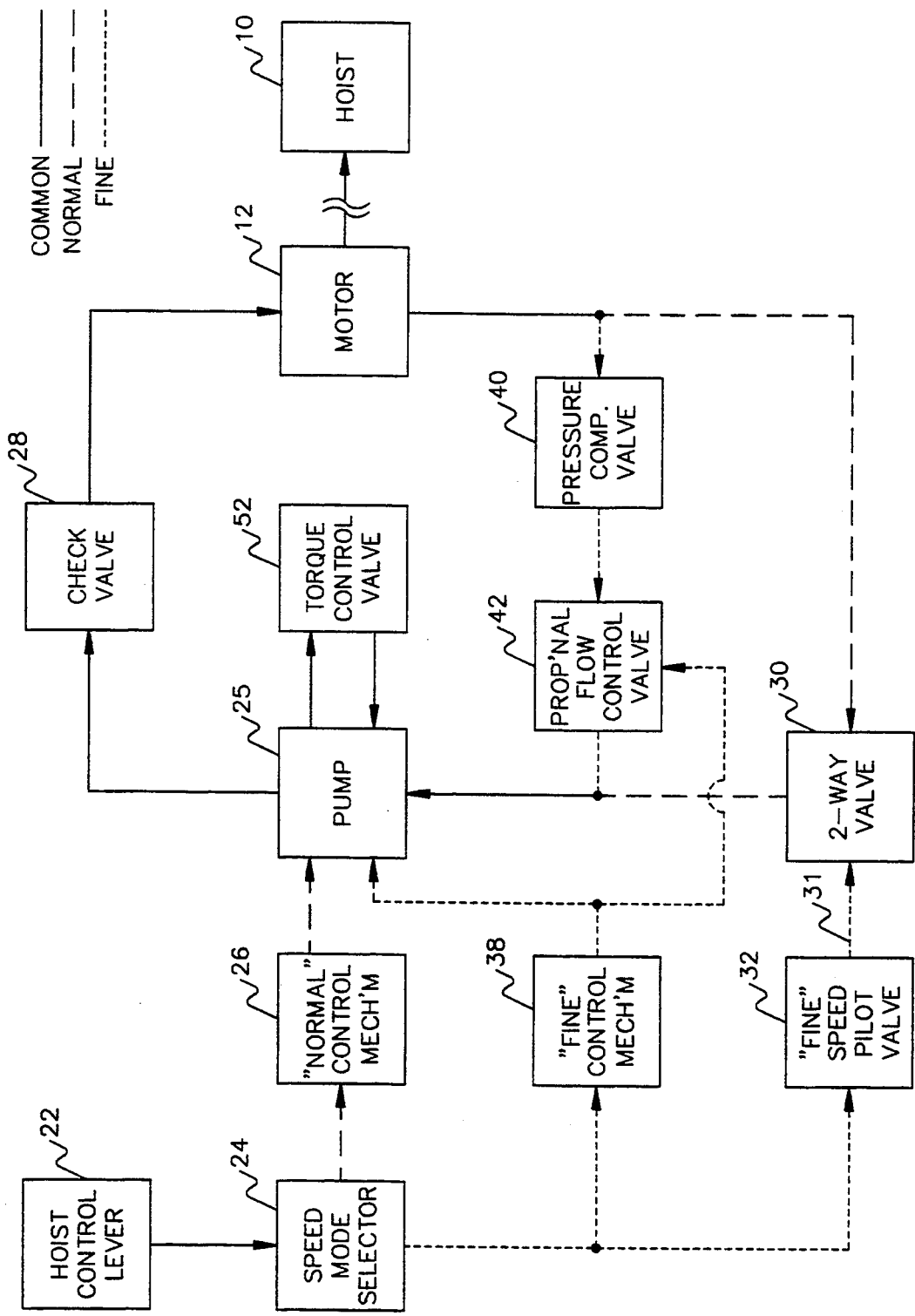
FIG. 2 is a block diagram of the circuitry of this invention.

FIG. 2 is a block diagram of the hydraulic circuitry of this invention showing the control means for mechanizing both the normal and the fine speed control modes. According to the legend, solid lines are common to both modes, long dashes to trace the normal operating mode and the short dashes relate to the fine speed control mode.

With reference to FIG. 2, the Hoist Control Lever Means 22 controls the rotation of the drum. The operator actuates a two-position Speed Mode Selector control means 24. In a first position, control means 24 configure the system to operate in a conventional or normal mode. The operation of the motor is a function of the displacement of a pump (not shown in FIG. 2) in pump module 25 which is controlled by the Normal Pump Control Mechanism 26. Control Mechanism 26 provides a signal to modulate the output pressure of a charge pump (not shown in FIG. 2) which adjusts the tilt and direction thereof of the pump swash plate. In that configuration, pressurized hydraulic fluid circulates from pump module 25, through check valve 28 to motor 12, thence through two-way valve 30 and back to pump module 25. In the first configuration, the pressure drop across motor 12 is a function of the load developed by hoist 10 and is therefore load-dependent.

When Speed Mode Selector 24 is set to the second position, the first circuit configuration is disabled and a second circuit configuration is enabled. In the second position, Mode Selector 24 sends a signal via Fine Speed Pilot Valve 32 over line 31 to two-way valve 30 to open the direct connection between motor 12 and pump module 25. Mode Selector 24 also sends a signal to Fine Valve Drive Mechanism 38. Fine Valve Drive 38 causes pump 25 to operate at a variable displacement at constant preselected pressure. In the second configuration, hydraulic fluid circulation flows from pump module 25, through check valve 28, motor 13, through pressure-compensator valve 40 and proportional-flow control valve 42 connected downstream of motor 12, back to pump module 25. The throttling action of the proportional-flow control valve is adjusted by the Fine Valve Drive 38. The operation of the motor 12 is a function of the throttling action of the proportional-flow control valve 42 which meters the fluid flow through the motor. Valve 42 is coupled to the outlet port of t he motor between the motor and the pump as shown. Pressure compensator valve 40 provides a desired constant pressure drop across proportional-flow control valve 42.

The means and methods for applying signals to the respective control means may be electrical or hydraulic. They are quite conventional in nature and are well known to those skilled in the hydraulic arts. Therefore, the details of control circuits that are not immediately germane to this invention has not been shown to avoid unnecessary complication of the drawings.

Figure 3:
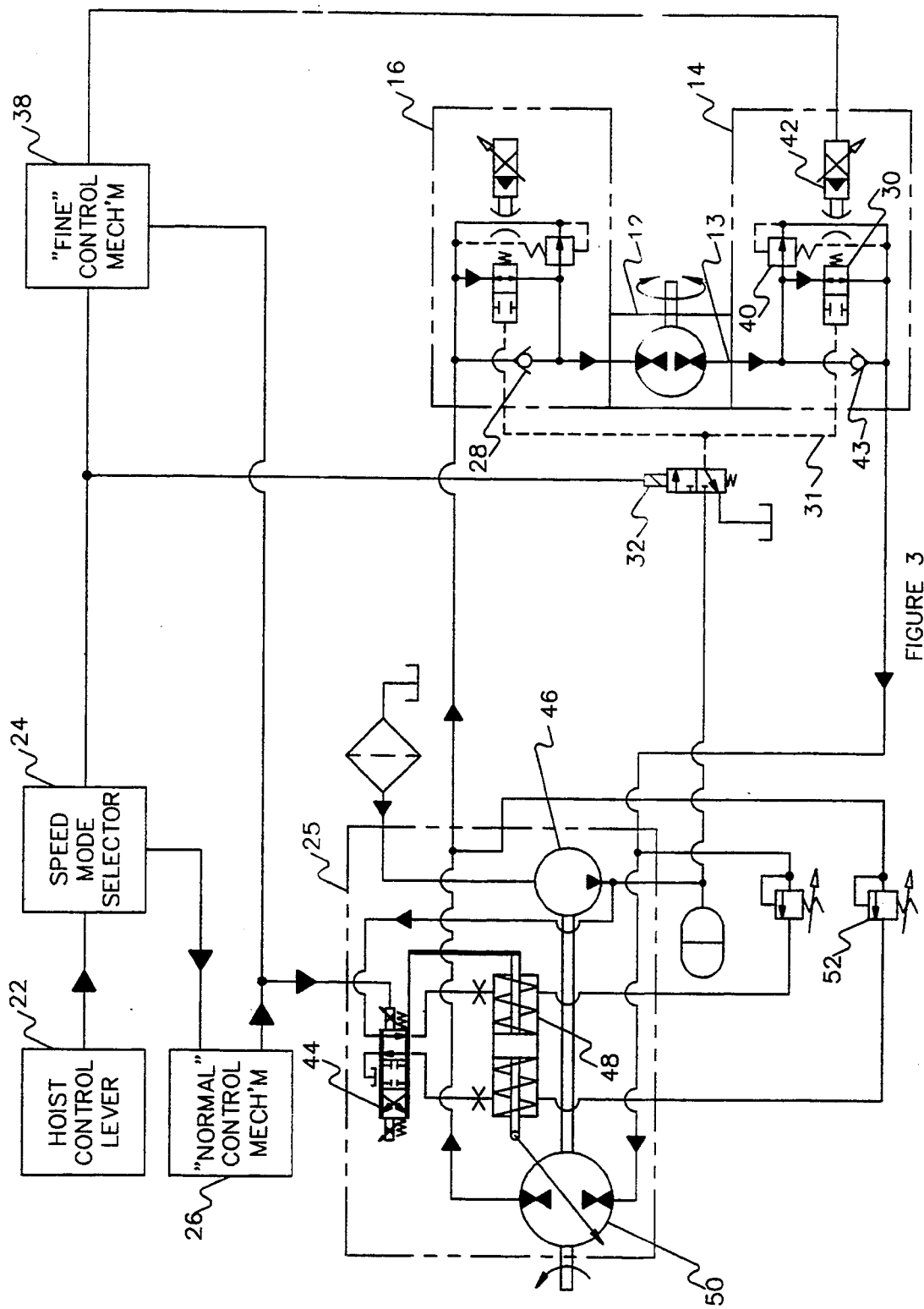
FIG. 3 is a schematic diagram of the hydraulic circuitry as configured in the normal speed mode of operation with the hoist working in the uphole direction.
Figure 4:
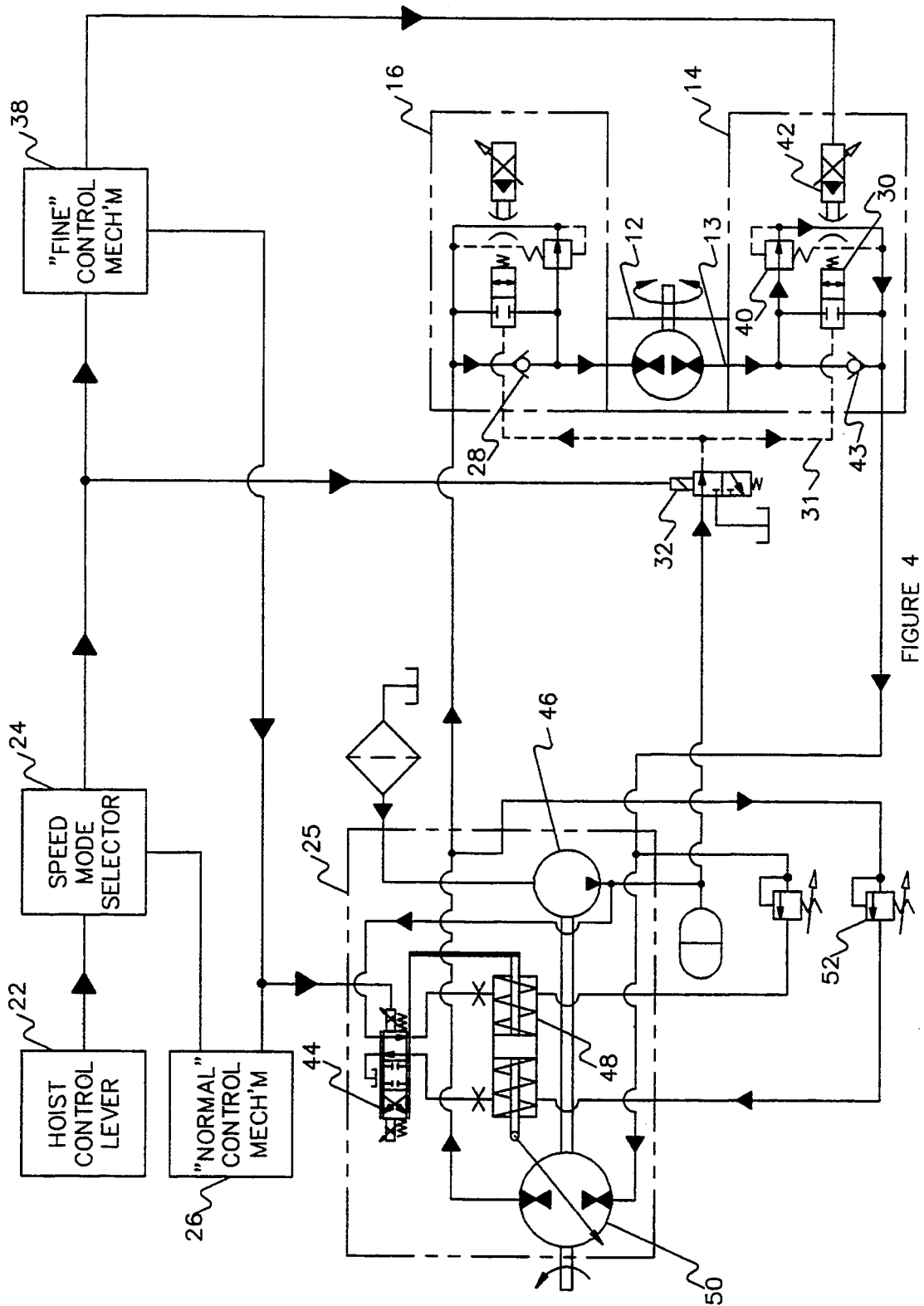
FIG. 4 is a schematic diagram of the hydraulic circuitry as configured in the fine speed mode of operation with the hoist working in the uphole direction.

FIG. 3 and 4 are detailed showings of the normal and fine speed control modes. In the interest of simplicity, the schematic diagrams are shown with valves set for rotating the hoisting drum 11 in the uphole direction for winding in a cable. It is evident that inverse settings provide for downhole rotation.

In FIG. 3, the pump module 25 is generally shown as 25. The pump module includes a servo valve 44, shown here as being solenoid actuated, that may be controlled by an Uphole Pump Control Signal generator 45. The control signal generator may be provided by a joy-stick type potentiometer controller to provide either an "uphole" and "downhole" signal to valve 44. Opening valve 44 admits pressure to a desired side of pump swash-plate displacement piston 48 thereby to control the displacement of pump 50 in proportion to the control signal level. The pump displacement is limited by the uphole torque control valve 52.

FIG. 3 shows the pump 50, interconnected with the motor in the first circuit configuration. Speed Mode Selector 24 (FIG. 2) is set to Normal Pump Control so that the nodal flow patterns of FIG. 2 and 3 apply. Fluid flows from the pump 50 to motor 12 via check valve 28 which is mounted in downhole manifold 16. From the motor outlet port 13, fluid flows through two-way valve 30 in uphole manifold 14 and back to the pump 50. Speed is a function of pump displacement and system pressure across the pump is load dependent.

The system is shown in the fine control speed mode in FIG. 4. As before in FIG. 3, fluid flows from pump 50 through check valve 28, to motor 12. However, in Fine speed control mode, fine speed pilot valve 32 has moved to close two-way valve 30 over fluid control line 31, thus disabling the normal speed control mode. Flow from the outlet 13 of motor 12 is diverted through proportional-flow control valve 42 because check valve 43 inhibits direct flow into the return line. The Fine Valve Drive Mechanism 38 (FIG. 2) provides a signal to proportional-flow control valve 42 to control the motor speed by metering the fluid flow through the motor as a function of the throttling action of Valve 42. Pressure compensating valve 40 maintains a constant pressure drop across proportional-flow valve 42. The pressure drop may be adjusted by the operator as previously mentioned.

Ordinarily, the system configuration of the dual-mode control system in the Normal Mode as defined by the first position of the Speed Mode Selector 24 is the default setting. The system, having been set to the Fine Mode configuration, is resettable to the Normal Mode by default.

This invention has been described with a certain degree of specificity and in particular with reference to a hoisting drum for use with a tool for use in logging formation characteristics of a borehole. The reference is exemplary only. The system of this invention may be used in any application that requires stable, uniform speed control over a wide dynamic range such as tracked personnel vehicles that operate in either the vertical or the horizontal dimensions. This invention is limited only by the appended claims.

What is claimed is:

1. A stable closed hydrostatic rotary power transmission system having a wide dynamic speed control range, comprising:
    a hydrostatic motor;
    a variable displacement hydrostatic pump;
    a two-position control means for
    (i) in a first position, interconnecting said pump with said motor through a first circuit configuration for controlling the operation of said motor as a function of the displacement of said variable displacement pump, and
    (ii) in a second position, disabling said first circuit configuration and interconnecting said pump with said motor through a second circuit configuration for controlling the operation of said motor as a function of the fluid flow as metered through a proportional flow control valve.

2. The system as defined by claim 1, wherein:
    the first position of said two position control means defines a normal motor speed control range; and
    the second position of said two position control means defines a fine motor speed control range.

3. The system as defined by claim 2, comprising:
    a first means, associated with said two-position control means, for defining the rotational speed of said motor by controlling the fluid flow therethrough as a function of a displacement control signal applied to said variable displacement pump; and
    a second means, associated with said two-position control means, for defining the rotational speed of said motor by metering the fluid flow therethrough as a function of the throttling action of said proportional flow control valve.

4. The system as defined by claim 2, wherein:
    the system pressure drop across the motor in said first circuit configuration is load-dependent; and
    the system pressure drop across said proportional flow control valve in said second circuit configuration is a preselected constant pressure.

5. The system as defined by claim 2, wherein:
    said normal motor speed range lies between 50 rpm and maximum rated rpm; and
    said fine motor speed range lies between <1.0 and 250 rpm.

6. The system as defined by claim 1, comprising:
    means, associated with said two-position control means, for defining the rotational sense of said motor in a desired direction.

7. The system as defined by claim 1, wherein:
    said two-position control means is a solenoid-controlled hydraulic pilot valve with said first position being a default setting.

8. The system as defined by claim 7, comprising:
    means, coupled to said two-position control means, for resettably setting said two-position control means to said second position.

9. A method for controlling the operation of a dual mode hydrostatic power transmission system at slow rotation rates, the system including a hydrostatic variable displacement pump interconnected with a hydrostatic motor, comprising:
    in a first mode, controlling the operation of said motor as a function of the hydraulic fluid flow as determined by the displacement of said variable displacement pump;
    in a second mode, fixing the displacement of said variable displacement pump to a desired constant value and controlling the operation of said motor by metering the fluid flow from the outlet port of said motor.

10. The method as defined by claim 9, wherein:
    said first mode is defined as a normal speed control mode for use in controlling the motor rotation speed in the range between 50 rpm and the maximum rated rpm for the motor; and
    said second mode is defined as a fine speed control mode for use in controlling the motor rotation speed in the range of <1.0 to 250 rpm.

11. The method as defined by claim 10, comprising:
    allowing the system pressure to vary as a function of load when the system is set to the first speed control mode; and
    setting the system pressure to a preselected constant pressure when the system is set to the second speed control mode.

* * * * *